United States Patent [19]

Kennedy

[11] Patent Number: 4,619,210
[45] Date of Patent: Oct. 28, 1986

[54] SOLID AND LIQUID WASTE INCINERATOR SYSTEM

[76] Inventor: Leo D. Kennedy, 1540 Dalmatia Dr., San Pedro, Calif. 90732

[21] Appl. No.: 698,368

[22] Filed: Feb. 5, 1985

[51] Int. Cl.⁴ .............................................. F23B 7/00
[52] U.S. Cl. .................................... 110/234; 110/238; 110/255; 110/256; 110/259
[58] Field of Search ............... 110/238, 235, 234, 255, 110/256, 259; 122/2

[56] References Cited

U.S. PATENT DOCUMENTS

| | | | |
|---|---|---|---|
| 3,022,753 | 2/1962 | Montgomery | 110/7 |
| 3,395,654 | 8/1968 | Weisberg | 110/8 |
| 3,722,433 | 3/1973 | Kramer | 110/8 R |
| 3,780,674 | 12/1973 | Liu | 110/8 |
| 3,858,534 | 1/1975 | Berg | 110/234 |
| 4,109,590 | 8/1978 | Mansfield | 110/235 |
| 4,116,136 | 9/1978 | Mallek | 110/251 |
| 4,289,079 | 9/1981 | Swistun | 110/255 |
| 4,320,710 | 3/1982 | Steiner | 110/281 |
| 4,321,877 | 3/1982 | Schmidt | 110/186 |
| 4,395,956 | 8/1983 | Hand | 110/235 |
| 4,398,476 | 8/1983 | Suzuki | 110/346 |
| 4,516,511 | 5/1985 | Kuo | 122/2 X |

Primary Examiner—Edward G. Favors
Attorney, Agent, or Firm—Fulwider, Patton, Rieber, Lee & Utecht

[57] ABSTRACT

A solid and liquid waste incinerator system is disclosed which utilizes the heat produced by the furnace to transform water into steam, the steam powering a steam turbine generator to produce electricity. Solid waste is automatically fed by conveyor belts into the opening in the upper portion of a gravity-fed furnace unit which has a rotating shredder unit for chopping and grinding solid waste. A rotating magnet selects the ferrous metals from the other solid waste materials at the entrance to the furnace unit. Adjustable nozzles are rotatably mounted to the furnace unit walls to inject fuel and oxygen which are ignited creating a flame. Burn grills are positioned to catch the falling solid waste and hold it in a position for combustion, and to release it after incineration is completed. Liquid waste, including toxic chemicals, are vaporized in an evaporation cylinder forming an inner chamber within the furnace unit.

18 Claims, 16 Drawing Figures

SOLID AND LIQUID WASTE INCINERATOR SYSTEM

BACKGROUND OF THE INVENTION

1. Field of the Invention

The present invention relates generally to incineration apparatus for disposing of solid and liquid waste.

2. Description of the Prior Art

With the advent of the pre-packaged consumer goods and with increasing population, ever-increasing amounts of waste are generated. Generally, such waste is collected and delivered to land-fill sites. As land-fill sites become more scarce, waste incineration becomes a more desirable alternative, particularly if the incineration system can be utilized to generate electricity.

In addition, environmentally-safe disposal of toxic chemicals has become an important public issue. Many of the previously-proposed incinerators were directed towards incinerating sludge or partially-dewatered sludge, rather than directed towards resolving problems of disposal of miscellaneous mixes of metal, paper and plastic solid waste as well as toxic chemicals.

U.S. Pat. No. 4,398,476 (Suzuki) discloses an apparatus for drying partially dewatered sludge pellets with a heat source, followed by dried distillation and gasification producing residual ash as a by-product. While useful for incinerating sewage sludge, this apparatus is not well-suited to handling metals, plastics or toxic chemicals.

Some of the prior art devices, such as U.S. Pat. No. 3,722,433 (Kramer), disclose an incinerator for processing solid and liquid waste providing two serially-connected combustion chambers. The first combustion chamber processes solid and semi-solid waste while the second chamber processes liquid waste, with the first chamber discharging into the second chamber to enhance combustion in the second chamber. While both Kramer and Suzuki disclose utilizing energy produced during one step of the combustion to enhance combustion in a later stage in the process, none of the prior art known to applicant utilizes a system wherein the large amounts of heat energy produced for combustion is utilized for any other purpose other than incineration.

SUMMARY OF THE INVENTION

It is a major object of the present invention to provide an incinerator which is capable of processing miscellaneous solid waste and liquid waste, including toxic chemical waste.

It is of the another object of the present invention to provide an incinerator of the aforedescribed nature which utilizes the large amounts of heat energy produced in such incinerator to raise the temperature of water to steam utilized to operate a steam turbine generator to produce electricity.

It is a further object of the present invention to provide a method for evaporating toxic chemicals and incinerating plastic without venting any toxic gas by-product into the atmosphere.

A solid and liquid waste incinerator embodying the present invention includes conveyor belt-loading of solid waste into a furnace unit having an evaporation cylinder within its interior, a plurality of gas-operated nozzles with ignition means for igniting a combination of fuel and oxygen creating a large flame, a sorting means for automatically selecting ferrous metal materals and separating them from the other solid waste materals prior to incineration, and a shredding and spreading means for grinding the solid waste as it enters the furnace unit and distributes the ground solid wastes to fall uniformally into the furnace unit. A plurality of conduit means are supported by the side walls of the furnace unit for containing water while it is heated in the furnace and for transporting the steam to a steam turbine generator.

Other objects and features of the invention will become apparent from consideration of the following description taken in connection with the accompanying drawings.

DESCRIPTION OF A PREFERRED EMBODIMENT

Figure 1:
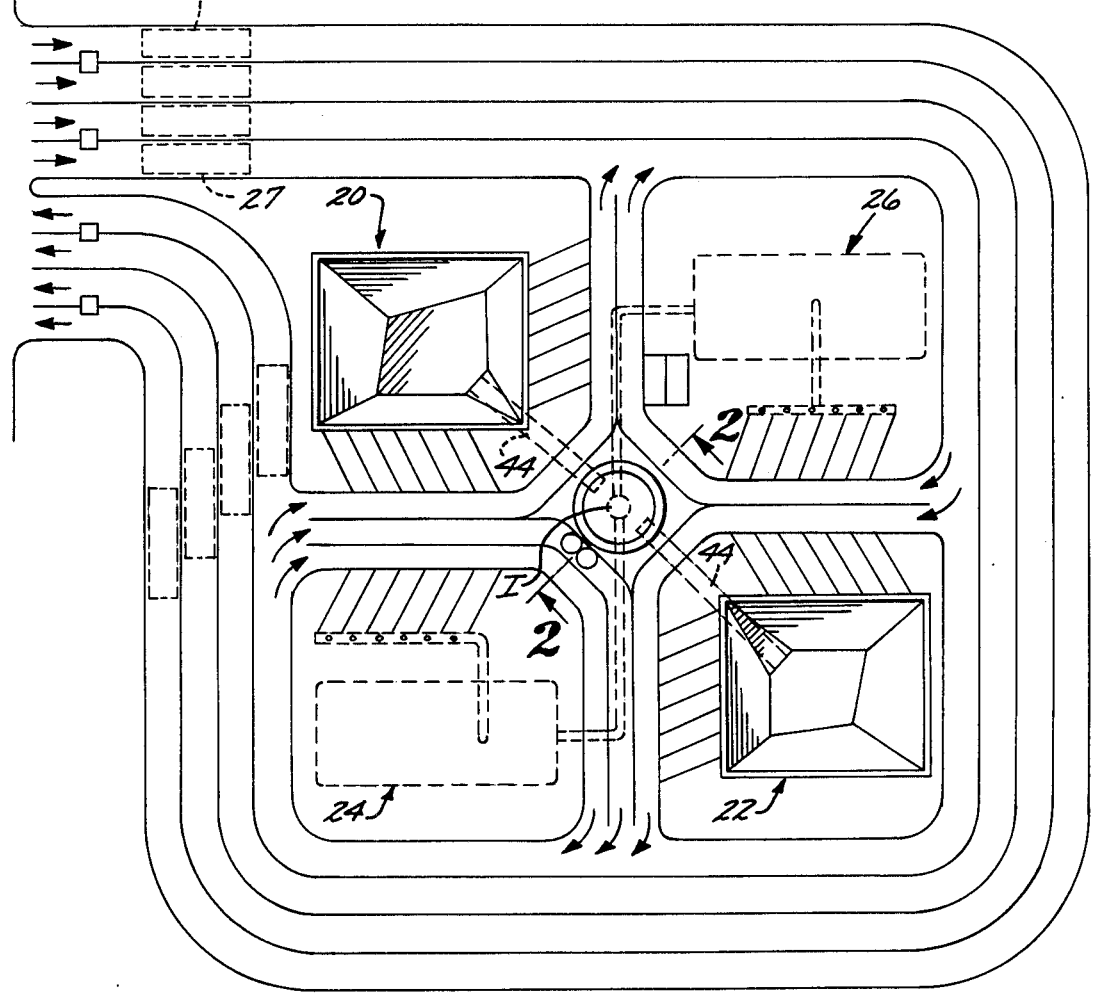
FIG. 1 is a top plan view of a solid and liquid waste incinerator system embodying the present invention.
Figure 8:
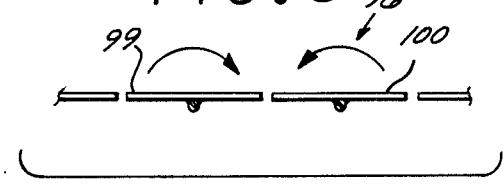
FIG. 8 is a vertical sectional view of the burn grill taken in enlarged scale along line 8—8 of FIG. 7.
Figures 2, 3, 4:
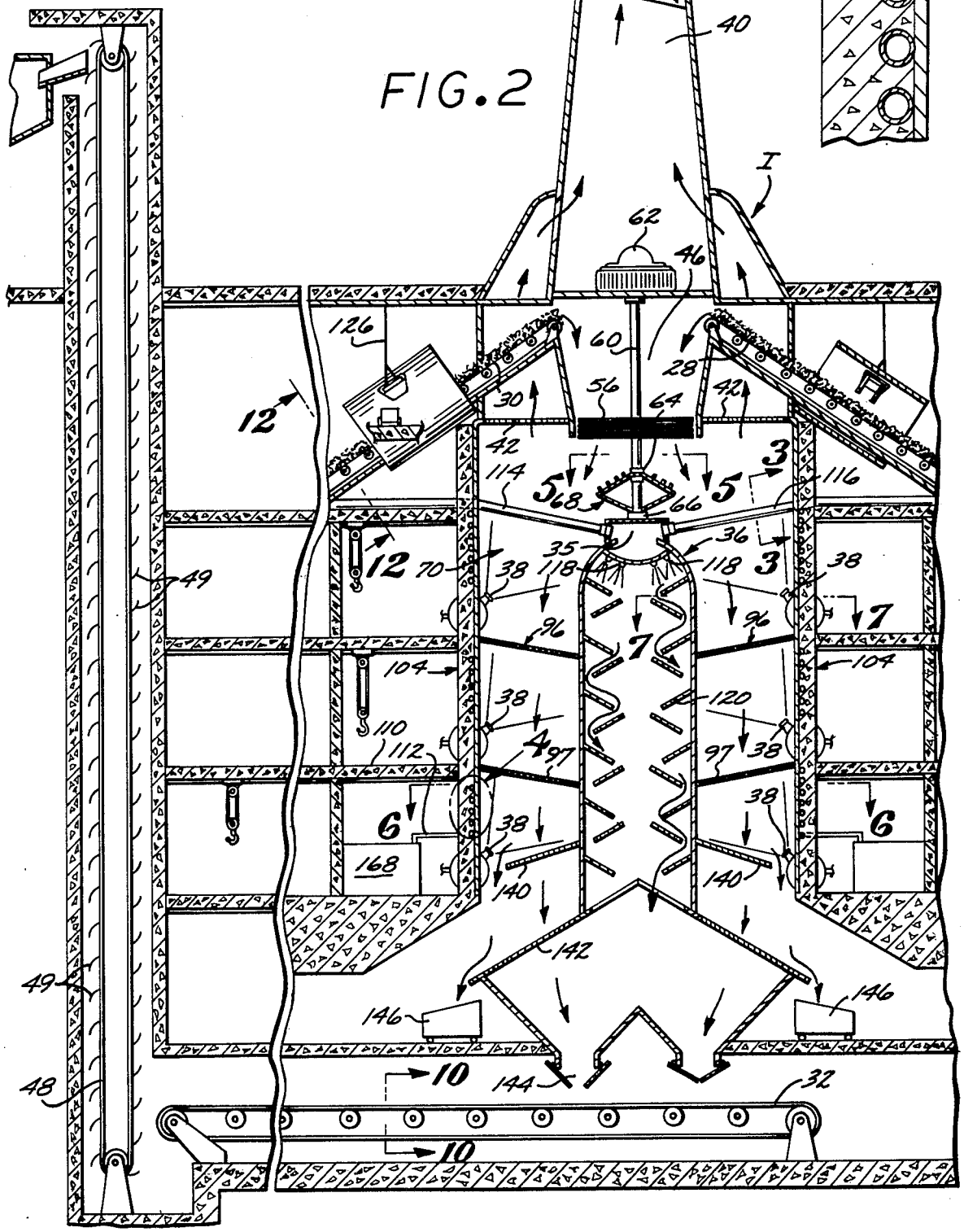
FIG. 2 is a vertical sectional view of the incinerator unit of said system taken in enlarged scale along line 2—2 of FIG. 1.
FIG. 3 is a generally vertical sectional view taken along line 3—3 of FIG. 2.
FIG. 4 is an enlarged view of the encircled area designated 4 in FIG. 2.

Referring to FIGS. 1 and 2, there is shown a top plan view of a preferred form of solid and liquid waste incinerator system embodying the present invention. Such system includes a centrally located incinerator unit I surrounded by first and second solid waste dumping pits, generally designated 20 and 22, respectively, and a pair of liquid waste reservoirs, generally designated 24 and 26, respectively. A four-lane roadway encircles the outer perimeter of the dumping pits 20 and 22 and the reservoirs 24 and 26. The roadways are traversed by waste-containing vehicles 27 which supply waste to the dumping pits 20 and 22.

Referring to FIG. 2, the incinerator is typically stationed underground and solid waste is moved into the incinerator unit from the dumping pits by a pair of upwardly-inclined conveyor belts 28 and 30. Ash from the incinerated solid waste is removed from the bottom of the incinerator by a horizontally-extending conveyor belt member 32 that intersects a vertical conveyor belt member 48. Liquid waste is piped into the upper portion 35 of an evaporation cylinder, generally designated 36, centrally-mounted within the incinerator unit I, such liquid waste entering the top of the evaporation cylinder through nozzles 118. A stack 40 and intake ventilators 42 mounted at the top of the incinerator unit I vents the smoke produced by the combustion to the outside.

More particularly, referring to FIG. 1, the unloading area includes dumping pits 20 and 22 which receive solid waste on the downwardly-disposed diagonal walls 44 such that gravity causes the solid waste material to slide down into the pit. Referring to FIG. 2, the waste materials are scooped from the dumping pits onto conveyor belts 28 and 30 which move the waste materials upward to the feeder holding cone 46 of the incinerator unit. The conveyor belts 28 and 30 are equipped with rows of steel spikes which are uniformly placed on the conveyor belts to grip and carry materials upward into the feeder holding cone.

Figure 12:
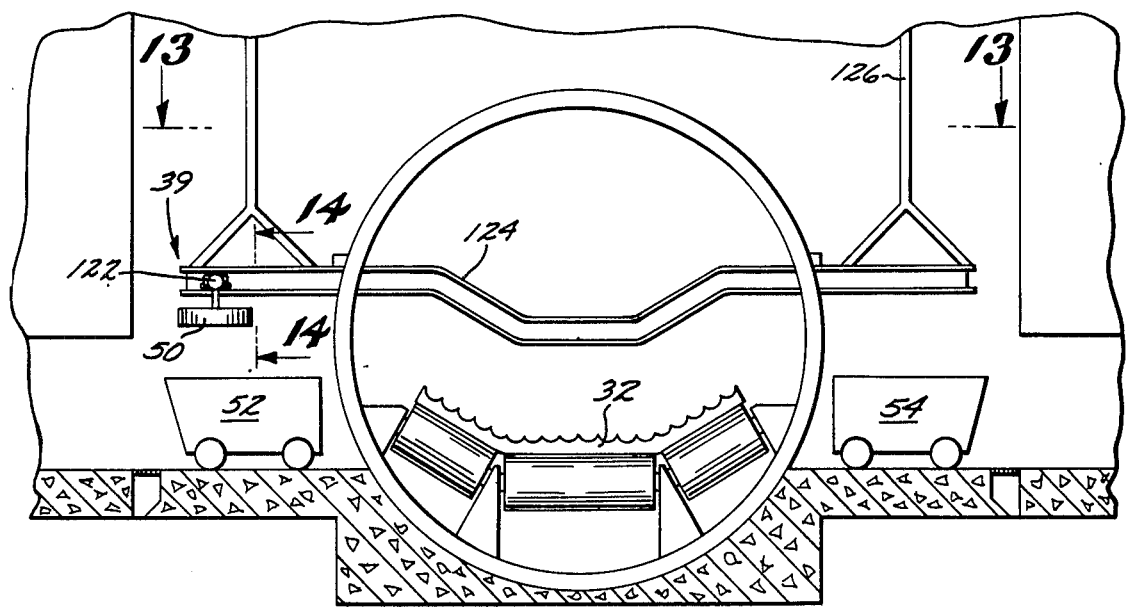
FIG. 12 is a sectional view taken along the lines 12—12 of FIG. 2.

Referring to FIG. 12, sorting means 39 comprising an electromagnet 50 which automatically selects the ferrous metal materials from the solid waste entering the furnace on conveyor belts 28 and 30. The electromagnets travel past the conveyor belt 28, tracing an oval pattern around the conveyor belts, as seen in the top plan view of FIG. 13, attracting the ferrous metal waste. When the electromagnet 50 moves past the conveyor belt, the electrical current to the electromagnets is momentarily switched off causing the ferrous metals to drop from the magnets into storage bin 52 and 54, freeing the electromagnets to attract more ferrous metals in its next cycle.

With reference to FIG. 2, the remaining solid waste materials are loaded into the feeder holding cone 46, falling onto a shredder unit 56 which includes rotating and fixed blades to chop up the waste materials into smaller pieces. The shredder unit is placed at the bottom portion of feeder holding cone 46 at the opening to the furnace.

With continued reference to FIG. 2, the waste materials continue to pass through the furnace from the shredder unit onto a deflector unit 68. The deflector unit and the shredder unit rotate with the rotation of the central drive shaft assembly 60 which interconnects the deflector unit, the shredder unit, and an electric turbine generator 62. The electric turbine generator provides the power and the drive shaft assembly rotates from the turbine generator to the deflector unit. The bottom portion of the drive shaft assembly from beneath the deflector remains stationary and is connected to bearing support 64 on the bottom portion of the deflector and to bearing gear 66 which is affixed to the exterior of upper chamber 35 of the evaporation cylinder 36.

Figure 5:
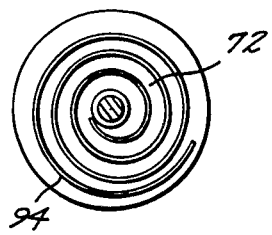
FIG. 5 is a horizontal sectional view in enlarged scale taken along line 5—5 of FIG. 2.
Figure 7:
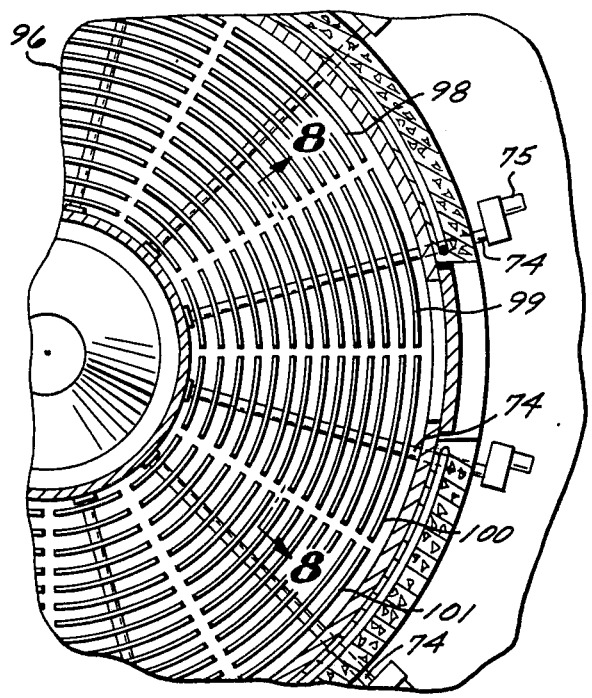
FIG. 6 and 7 are views taken along line 6—6 and line 7—7 of FIG. 2 showing the operation of burn grills mounted within the incinerator unit.

With continued reference to FIG. 2, as the particles of solid waste material fall onto the deflection unit 68 from the shredder unit 56, the deflection unit distributes the waste materials as they fall through the furnace chamber 70 for incineration as shown by the downward arrows of FIG. 2. Furnace chamber 70 is formed by sidewalls 104 and ventilators 42. The waste materials fall onto dividers 72 of the deflection unit which are formed in a spiral pattern as best seen in FIG. 5. The centrifugal force created by the spinning of the deflector unit 68, which rotates with the central drive shaft, causes the waste materials to collect at the outermost divider 94 and are disbursed from divider 94 as the deflector unit rotates, falling through the furnace and onto burn grills 96 comprised of separate sections of which 98, 99, 100 and 101 are seen in FIG. 7.

With continued reference to FIG. 2, the furnace is heated to temperatures of 1100 to 1200 degrees Fahrenheit by gas-operated nozzles 38 which are vertically spaced and rotatably mounted to the side walls 104 of the furnace chamber 70. The nozzles include ignitor tips for igniting a combination of kerosene and oxygen creating a large flame which emanates from the nozzles in a torch-like effect. The nozzles may be directed such that the flame is directed under burn grill 96. The nozzles may spray a liquid acetate on the solid waste materials to enhance the combustion of the plastic waste.

Figure 6:
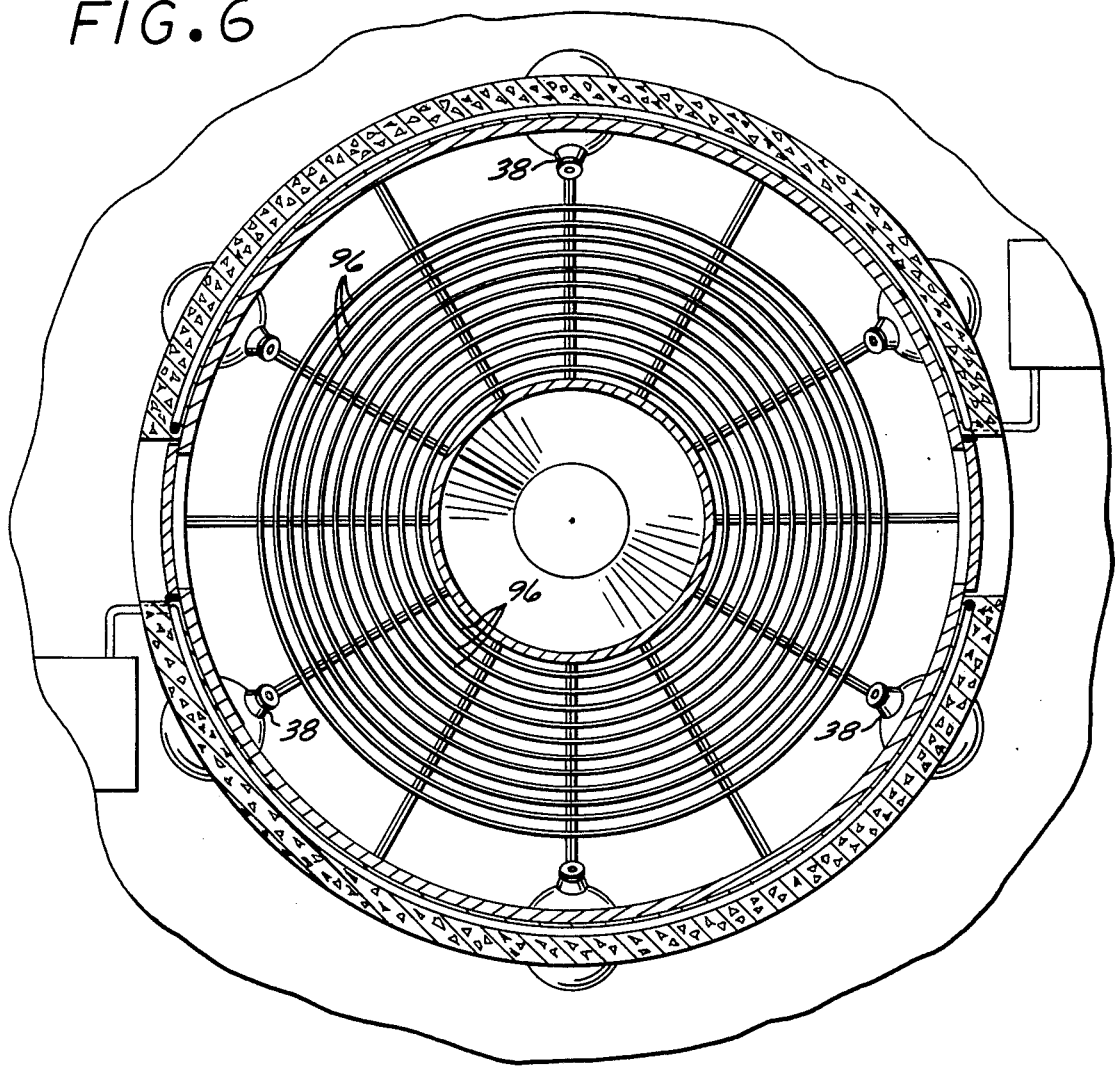

The burn grill includes closely-spaced, concentric rings 96 which are discontinuous as shown in FIG. 6 and typically comprised of metal, such as hardened steel. The burn grills hold the waste material as it is burned by the flame. Operators may monitor the incinerator through video cameras and direct the nozzles and the flame from external controls for maximum combustion.

Figure 9:
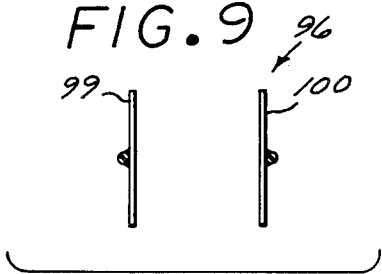
FIG. 9 is a vertical sectional view of the burn grill as in FIG. 8, showing the open or Dump Mode.
Figure 11:
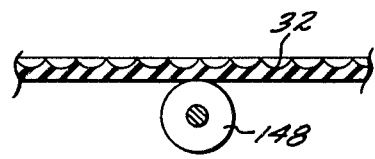
FIG. 11 is vertical sectional view taken along the lines 11—11 of FIG. 10.

Referring to FIG. 2, upper grills 96 open downwardly, permitting the burned waste material to fall onto lower burn grills 97, and burn grills 97 open downwardly causing the material to fall further onto screens 140. FIG. 9 shows the downwardly-opening movement of the burn grills. As seen in FIG. 7 the burn grills open downwardly as a result of their connection to rotating shafts 74, are axially-placed and emanate radially from the center to the circumference of the circular burn grills. The rotating shafts permit the burn grills to open downwardly at the discontinuities, between the sections of the burn grills, as best seen in FIG. 7. As the shafts 74 are turned, by handle 75 the burn grills are opened and closed.

It should be understood that the heat of the furnace is used to operate a steam turbine generator 168 as shown in FIG. 2 which produces electricity by converting the large amount of energy generated by the furnace into electrical energy. Conduits 110, which may be flexible hose in a preferred embodiment, are embedded in walls 104 of the furnace, said walls typically made of concrete, as best seen in FIG. 4. The conduits contain water which is heated by the extreme heat of the furnace creating steam and are connected to the steam turbine 168 as input at 112. The electrical energy produced by the steam turbine is used to provide power to the electric turbine generator 62.

It will be appreciated that the present invention will also dispose of liquid waste, such as toxic chemicals. Liquid waste flows through pipes 114 and 116 into the upper chamber 35 of the evaporation cylinder 36 and is mixed with crude petrolum waste and oxygen for increased combustion and sprayed through nozzles 118. There are typically three pipes equidistantly-spaced which, in addition to carrying liquid waste, also serve as supports for the evaporation cylinder. Pipe 116 may be comprised of an inner tube 117 through which the liquid waste flows while pipe 116 serves as a support and protective shield as seen in cross-section in FIG. 3. The waste liquid is vaporized as it falls onto baffle plates 120 which directs the flow of the liquid waste as it flows downward through the evaporation chamber. By the time the liquid travels through the last baffle plate at the bottom of the evaporation chamber, all the liquid has been evaporated.

Figure 13:
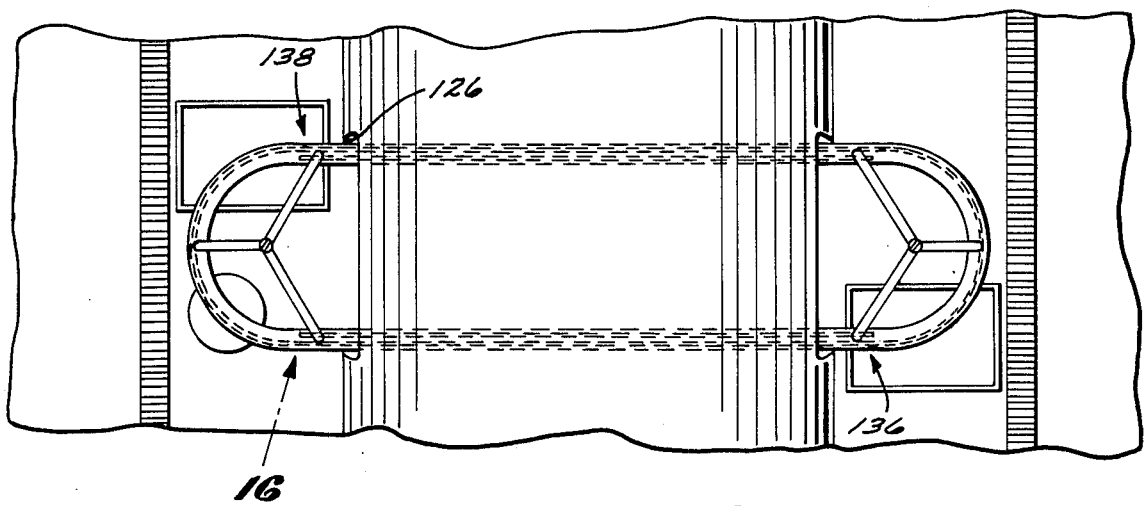
FIG. 13 is a sectional view taken along the lines 13—13 of FIG. 12.

Referring to FIGS. 12 and 13, the electromagnets are suspended from trolley 122 which travels on I-beam track 124. The I-beam track is suspended from the ceiling of the incinerator by hangers 126 as shown in FIGS. 2 and 12. The trolley and electromagnet travels an oval-shaped pattern back and forth across the conveyor belts as seen in FIG. 13.

Figure 14:
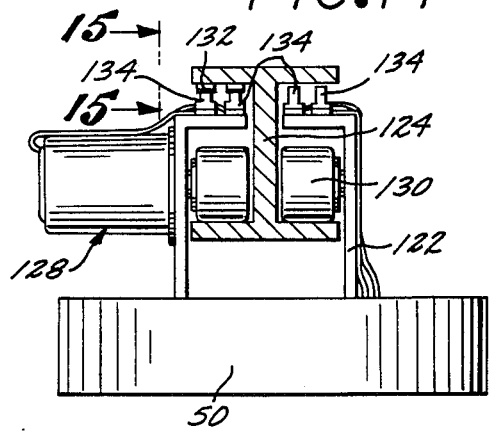
FIG. 14 is a sectional view taken along the lines 14—14 of FIG. 12.
Figure 15:
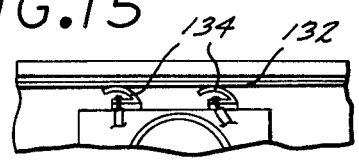
FIG. 15 is a sectional view taken along the lines 15—15 of FIG. 14.
Figure 16:
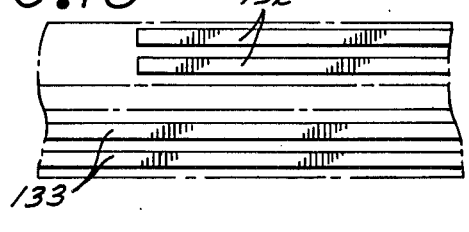
FIG. 16 is a view of the contact strips taken along the line 16 of FIG. 13.

Referring to FIG. 14, an electrical strip motor 128 provides power to move the trolley and electromagnet by causing rollers 130 to rotate. The electrical strip motor also energizes the electromagnets. Referring to FIG. 16, electrical contacts strips 132 complete the circuit, together with spring-loaded contacts 134 as seen in FIG. 15. The electrical contact strips 132, which energize the electromagnets, are discontinuous, stopping at the arcuate ends 136 and 138 of the oval pattern as seen in FIG. 13. The electrical contact strips 133 which complete the circuit energizing the electrical strip motor to operate the trolley are continuous as the trolley moves continuously in the oval-shaped pattern.

Hence, the electromagnets are demagnetized when they reach the discontinuity in the electrical contact strips which opens the circuit providing electrical power to the electromagnet. As the electromagnet is turned off, the ferrous metal scraps fall into the positioned storage carts 52 and 54.

In a preferred embodiment, the incinerator system is automated and controlled by automation means in a conventional manner which may include a central processing unit (CPU) and a temperature transducer placed inside the furnace which produces analog signals proportional to the furnace temperature which, after conversion to digital signals, are transmitted to the CPU. The CPU generates a signal for controlling the amount of kerosene and oxygen flowing through nozzles 38, thus controlling the size of the flame. A CPU-generated signal may also control the flow rate of the liquid waste through nozzles 118. The CPU digital signal is converted to an analog signal and transmitted to a proportional solenoid valve to control the flow of kerosene and oxygen. The conveyor belts may be automatically actuated, the nozzles automatically positioned and the burn grills automatically opened and closed in accordance with a programmed timing sequence from the CPU which signals actuators controlling the nozzles and the burn grills. Trucks carrying solid and liquid waste may be automatically weighed as they enter the site and the information stored in computer memory.

Referring to FIG. 2, by the time the burned waste material reaches screen 140, it has been reduced to ashes which are sifted through screen 140 and smaller mesh screen 142. The ashes fall through a hopper 144 and out through openings in the bottom of the hopper onto a horizontal conveyor belt assembly 32. The inorganic solid waste material, such as metals, are too large to sift through screen 140 and are thus separated by falling through the opening between screen 140 and wall 104 and sliding off screen 142 into separate storage carts 146 on the floor of the furnace basement.

Figure 10:
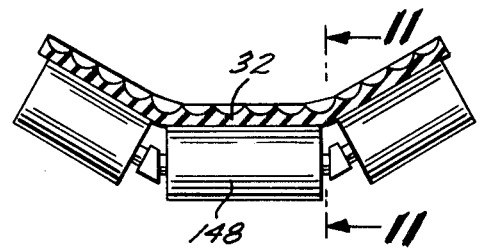
FIG. 10 is an enlarged vertical sectional view of a conveyor belt taken along the lines 10—10 of FIG. 2.

The ash by-product of the solid waste material is moved out of the furnace on the horizontal conveyor belt 32 which intersects vertical conveyor belt 48. Vertical conveyor belt 48 has trough-like elements 49 which scoop up the ash from the horizontal conveyor belt and carry it upward to the ground level of the incinerator site and into waiting dump trucks for removal to land fill sites. Horizontally-moving conveyor belt 32 includes rollers 148 which are pivotally interconnected such that the conveyor belt may be diagonally and upwardly disposed, forming a concave shape which serves to contain the ashes as best seen in FIG. 10.

Various modifications and changes may be made with respect to the foregoing detailed description without departing from the spirit of the present invention.

I claim:

1. A solid and liquid waste incinerator comprising:
    a furnace unit for generating heat having side walls and an evaporation cylinder located within the side walls;
    a plurality of nozzles rotatably mounted along the side walls of said furnace unit and positioned at the upper portion of said evaporation cylinder and including ignition means for commencing combustion;
    a plurality of loading means for moving said waste into said furnace unit;
    a steam turbine generator utilizing said heat generated by said furnace unit for generating electrical energy and;
    a plurality of conduit means for containing and transporting water and steam to said steam turbine generator, said conduit means located within said furnace unit whereby heat energy produced by said furnace unit causes said water to change state to steam thereby energizing said steam turbine generator to produce electrical energy.

2. A solid and liquid waste incinerator in accordance with claim 1 further comprising a plurality of sorting means for automatically selecting ferrous metals from the solid waste.

3. A solid and liquid waste incinerator in accordance with claim 1 further comprising a plurality of storage units for retaining said solid and liquid waste wherein said loading means transports said solid and liquid waste from said storage units into said furnace unit and evaporation cylinder, respectively.

4. A solid and liquid waste incinerator in accordance with claim 1 further comprising a plurality of grill means affixed to said side walls of said furnace for receiving said solid waste and retaining said solid waste during incineration and releasing said waste after incineration.

5. A solid and liquid waste incinerator in accordance with claim 1 further comprising means for removing ashes produced by combustion from said furnace unit.

6. A solid and liquid waste incinerator in accordance with claim 1 further comprising a plurality of shredding means for grinding said solid waste and including spreading means for distributing shredded waste throughout said furnace unit.

7. A solid and liquid waste incinerator in accordance with claim 2 wherein said sorting means includes electromagnets for attracting ferrous metals and an electrical current generating means for energizing said electromagnets.

8. A solid and liquid waste incinerator in accordance with claim 7 wherein said electrical current generating means includes an electrical strip motor, a plurality of discontinuous electrical contact strips, and a plurality of spring-loaded contact members for making electrical contact between said contact strips and said strip motor whereby said electromagnets are energized when said contact members intersect said strips, thereby attracting ferrous metals, and said electromagnets are de-energized when said contact members intersect said discontinuities of said strips thereby causing said electromagnets to release said ferrous metals.

9. A solid and liquid waste incinerator in accordance with claim 2 further comprising a plurality of storage units for retaining said solid and liquid waste wherein said loading means transports said solid and liquid waste from said storage units into said furnace unit and evaporation cylinder, respectively.

10. A solid and liquid waste incinerator in accordance with claim 2 further comprising a plurality of grill means affixed to said sidewalls of said furnace for receiving said solid waste and retaining said solid waste during incineration and releasing said waste after incineration.

11. A solid and liquid waste incinerator in accordance with claim 2 further comprising means for removing the ashes from said furnace unit produced by combustion.

12. A solid and liquid waste incinerator in accordance with claim 2 further comprising a plurality of shredding means for grinding said solid waste and including spreading means for distributing said shredded waste throughout said furnace unit.

13. A solid and liquid waste incinerator in accordance with claim 3 further comprising a plurality of grill means affixed to said sidewalls of said furnace for receiving said solid waste and retaining said solid waste during incineration and releasing said solid waste after incineration.

14. A solid and liquid waste incinerator in accordance with claim 3 further comprising means for removing the ashes produced by combustion from said furnace unit.

15. A solid and liquid waste incinerator in accordance with claim 3 further comprising a plurality of shredding means for grinding said solid waste and including spreading means for distributing said shredded waste throughout said furnace unit.

16. A solid and liquid waste incinerator in accordance with claim 4 further comprising a plurality of storage unit for retaining said solid and liquid waste wherein said loading means transports said solid and liquid waste from said storage units into said furnace unit and evaporation cylinder, respectively.

17. A solid and liquid waste incinerator in accordance with claim 4 further comprising means for removing ashes produced from combustion from said furnace unit.

18. A solid and liquid waste incinerator in accordance with claim 4 further comprising a plurality of shredding means for grinding said solid waste and including spreading means for distributing said shredded waste throughout said furnace unit.

* * * * *